United States Patent [19]

Beard

[11] Patent Number: 4,599,715
[45] Date of Patent: Jul. 8, 1986

[54] METHOD AND APPARATUS FOR SOUND TRACK REPRODUCTION

[76] Inventor: Terry D. Beard, 1407 North View Dr., Westlake, Village, Calif. 91361

[21] Appl. No.: 630,444

[22] Filed: Jul. 13, 1984

[51] Int. Cl.$^4$ .............................................. G11B 7/00
[52] U.S. Cl. ..................................... 369/124; 369/125
[58] Field of Search ............... 369/124, 125, 100, 120; 352/27

[56] References Cited

U.S. PATENT DOCUMENTS

| 4,169,219 | 9/1979 | Beard | 369/124 |
| 4,355,383 | 10/1982 | Dolby | 369/125 |

OTHER PUBLICATIONS

Frayne and Wolfe, Elements of Sound Recording, John Wiley & Sons, Inc., chapters 15 and 18, pp. 272-289, 334-359.

*Primary Examiner*—Donald McElheny, Jr.
*Attorney, Agent, or Firm*—Koppel & Harris

[57] ABSTRACT

A method and apparatus is disclosed for the reproduction of a sound signal recorded on a variable density optical sound track negative, in which the amount of light transmitted through the sound track is related to its exposure by a predetermined relationship. Light transmitted through the sound track is transduced to an electrical signal having a magnitude which varies in accordance with the amount of transmitted light, and this signal is operated on by a function which is substantially equivalent to the inverse of the predetermined relationship to produce an output signal which directly corresponds to the exposure of the sound track. An adjustment mechanism is provided to eliminate distortion and to enable the production of an accurate output signal even when the relationship between the light transmission and exposure of the sound track is unknown. The prior art requirement of producing a print from the negative, with exacting and sometimes unknown characteristics, is eliminated by the use of a convenient electrical circuit.

15 Claims, 4 Drawing Figures

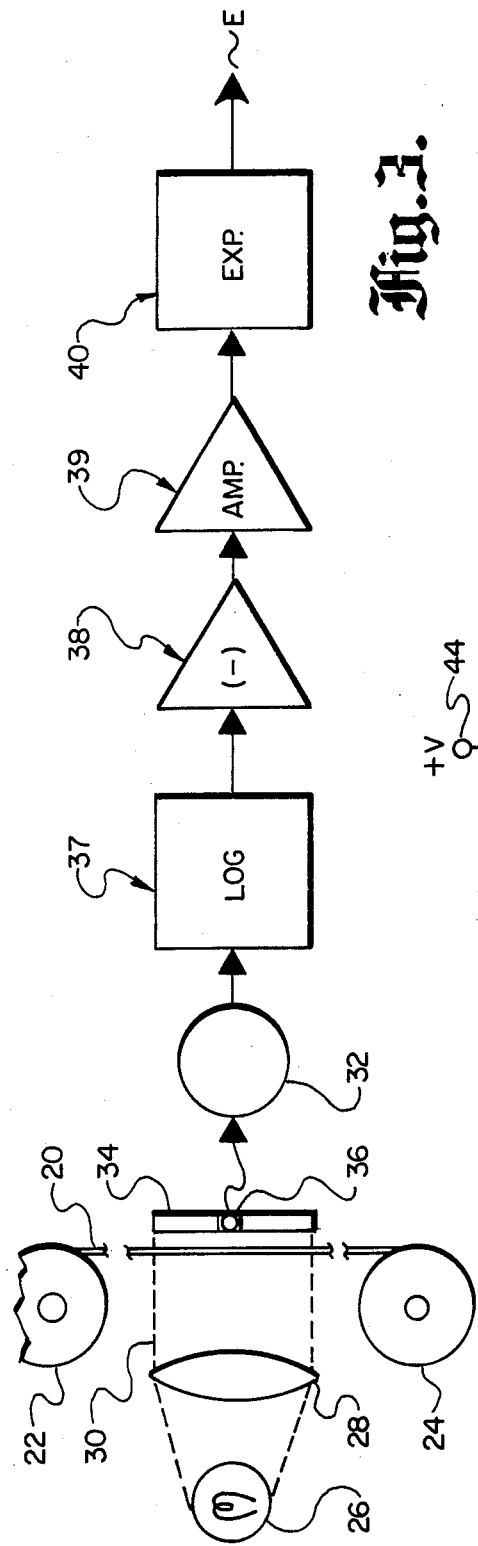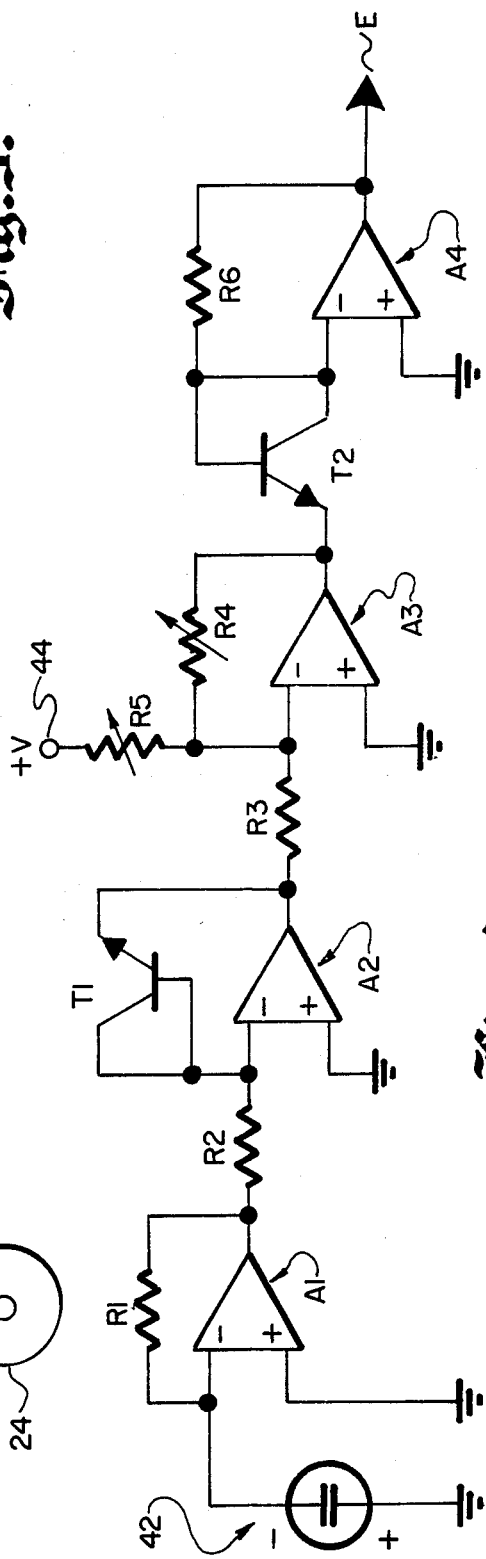

METHOD AND APPARATUS FOR SOUND TRACK REPRODUCTION

BACKGROUND OF THE INVENTION

1. Field of the Invention

This invention relates to a method and electrical circuitry for the reproduction of optical sound tracks recorded on photographic film, and more particularly to the reproduction of sound tracks recorded as variable density recordings for motion picture sound.

2. Description of the Prior Art

The sound for motion pictures is usually recorded photographically on the print film for the finished motion picture. To print this photographic sound track on the "release print", a photographic negative sound track is first recorded. The negative is then used to print the sound track onto the release print as the picture is being printed.

There are two types of photographic sound tracks in general use: variable area, and variable density. A "variable area" sound track print is recorded as a varying width clear area in the sound track portion of a film, as illustrated in FIG. 1. In this figure a piece of a motion picture print 2 is shown with a sound track area 4 upon which a varying width clear area 6 has been recorded. The area 8 within the sound track on either side of the clear area is opaque. The sound track is scanned by a slit 10 located on the opposite side of the film from a light source. The slit passes on light which has been transmitted through a narrow area of the sound track oriented transverse to the direction of film travel 12. Thus, as the film moves the amount of light passing through the film slit varies in response to the recorded sound modulation. This light is detected by a photoelectric cell whose output is processed and used to reproduce the recorded sound. This type of system is disclosed in my U.S. Pat. No. 4,328,574, issued May 4, 1982, which also discloses a detection system for crossmodulation distortion on the sound track.

A "variable density" sound track is illustrated in FIG. 2. The sound track area 14 is again scanned by a reading slit 16 as the film travels in direction 18. In this case the density or transmission of the track area is modulated uniformly across the entire width of the sound track. Variable density sound tracks are printed in a manner similar to that used to print variable area sound tracks. A negative is made with a light transmission capability that varies in response to the recorded sound, and used to expose the sound track portion of the print as the picture is being exposed onto the release print.

The ability of a piece of photographic film to transmit light is determined by the amount of light to which the film is exposed prior to development. Within a given range of exposure the transmission of a piece of film is related to its exposure by the relationship $T = KE^{-g}$ where T = transmission of the film,
K = a constant,
E = exposure of the film in units of energy per area, and
g = gamma, a constant relating the film's transmission to its exposure.

If a negative is exposed to an amount of light which varies directly with the amplitude of the sound to be recorded, the transmission of light through the negative is not linearly related to the original sound as represented by E, but rather is related by an exponential function. If the transmission of a negative thus recorded is read by a playback slit such as slit 16 in FIG. 2, the result will be a highly distorted signal. This distortion is ordinarily corrected by making a print whose gamma is such that it cancels the distortion.

Since light is transmitted through the negative to make the print and again through the print to reproduce the original sound signal, two transmission factors of $KE^{-g}$ are encountered. In the prior art an attempt has been made to select the negative and print films such that the product of their gammas is unity, thereby cancelling the non-linear transmission characteristics of the negative and print so that the finished print produces a faithful, distortionless reproduction of the original negative exposure. This process requires the making of a print whose gamma is exactly correct in order to faithfully reproduce a distortionless sound track. This is particularly difficult with many older negatives, which have unknown gammas, and which require prints to be made with characteristics that are difficult to obtain with contemporary film stocks.

SUMMARY OF THE INVENTION

In view of the above problems associated with the prior art, an object of this invention is to provide a method and apparatus for electrically compensating for the distortion introduced in the negative recording process, and thereby permit the distortionless playback of a variable density negative without having to make a compensating print.

Another object is the provision of a method and apparatus for conveniently and accurately adjusting the effective reproducing gamma by electronic means to provide a more accurate reproduction than is attainable by making a print.

A further object is the provision of a method and apparatus for removing residual distortion from prints that have been incorrectly made from variably density sound track negatives.

In the achievement of these and other objects, a method and system is provided in which light is transmitted through a variable density optical sound track, and a transducer produces an electrical signal the magnitude of which varies in accordance with the amount of transmitted light. The electrical signal is then operated on by a function which is substantially the inverse of the functional relationship between the amount of transmitted light and the sound track exposure. The result is an output electrical signal which directly corresponds to the sound track exposure, and which can either be recorded directly onto a magnetic tape for integration with the picture, or used to form a final print using other techniques. An adjustment mechanism is included for modifying the functional means so as to reduce any excursions in the output signal from a direct correspondence with the sound signal originally recorded on the negative.

In a preferred embodiment, the transduced electrical signal is operated on by a function which is substantially proportional to the antilogarithm of $-\ln t/g$, where t is the magnitude of the electrical signal and ln is the logarithm function. The preferred circuitry for accomplishing this result includes a logarithmic circuit which is connected to the transducer to produce an electrical signal corresponding to $\ln t$, a multiplier circuit which is connected to multiply the output of the logarithmic circuit by a factor substantially equal to $-1/g$, and an antilogarithm circuit connected to produce an output signal which is the antilogarithm of the multiplier circuit output. The multiplier preferably comprises an operational amplifier with a negative resistive feedback loop, the resistance value of the feedback loop being variable to enable adjustment of the amplifier. Another degree of control is obtained by providing a variable resistor between a positive voltage reference and the inverting amplifier input; adjustment of the resistor produces a corresponding adjustment in the operating range of the antilogarithm circuit.

These and other features and advantages of the invention will be apparent to those skilled in the art from the following detailed description of a preferred embodiment, taken together with the accompanying drawings, in which:

DESCRIPTION OF THE DRAWINGS

FIG. 3 is a block diagram of a sound track reproduction system constructed in accordance with the invention; and FIG. 4 is a schematic diagram of the circuitry comprising the electrical processing portion of the system shown in FIG. 3.

DETAILED DESCRIPTION OF A PREFERRED EMBODIMENT

Figure 1:
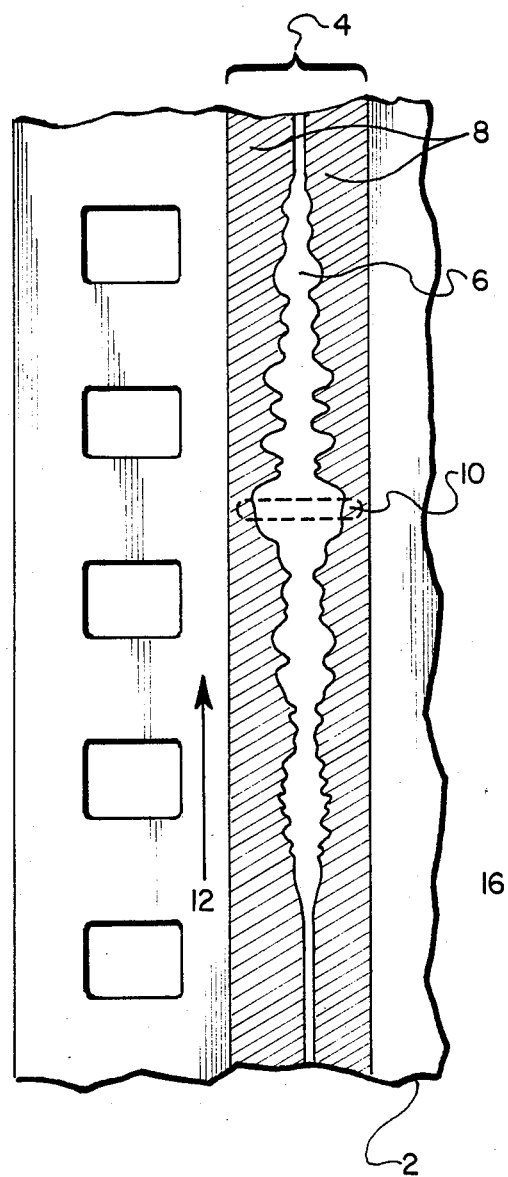
FIGS. 1 and 2 are fragmentary plan views illustrating a known technique for scanning variable area and variable density sound tracks, respectfully.

The present invention totally eliminates the need for the production of a compensating print from the variable density sound track negative by employing instead an electrical circuit which electronically performs a compensation function. The circuit's transfer characteristic is made conveniently adjustable so that it can provide accurate compensation for different negatives having different g's. The adjustment feature can also be used to establish the proper conpensation for a particular negative when the g for the negative is unknown. This in effect replaces the costly and time consuming prior art process of producing a succession of prints, each print hopefully being of somewhat better quality than the immediately preceding one, with a simple circuit adjustment that can be performed in a very short time and with little expense or effort.

The invention builds upon the basic relationship given above in which the film transmission is proportional to $E^{-g}$. An electronic circuit is provided which introduces a distortion that is complementary to and thereby compensates for the negative sound track distortion. This yields a net output signal which directly corresponds to the exposure of the sound track, and thereby to the original sound signal. Specifically, from the foregoing relationship between light transmission and exposure, the exposure of the negative can be derived as being proportional to the antilogarithm of $-\ln T/g$. Electronic circuitry is provided to simulate this mathematical operation, and thereby produce the desired output signal.

Referring to FIG. 3, a system for accomplishing this function is illustrated. The opposite ends of a film negative 20 are wound about reels 22, 24, which rotate to advance the film through a scanning area. A suitable light source 26, such as a light emitting diode, is arranged in conjunction with a collimating lens 28 to direct a beam of light 30 onto the film strip. A light detector 32, which may comprise a conventional photocell, is positioned on the opposite side of film strip 20 and produces an electrical output proportional to the amount of incident light.

Figure 2:
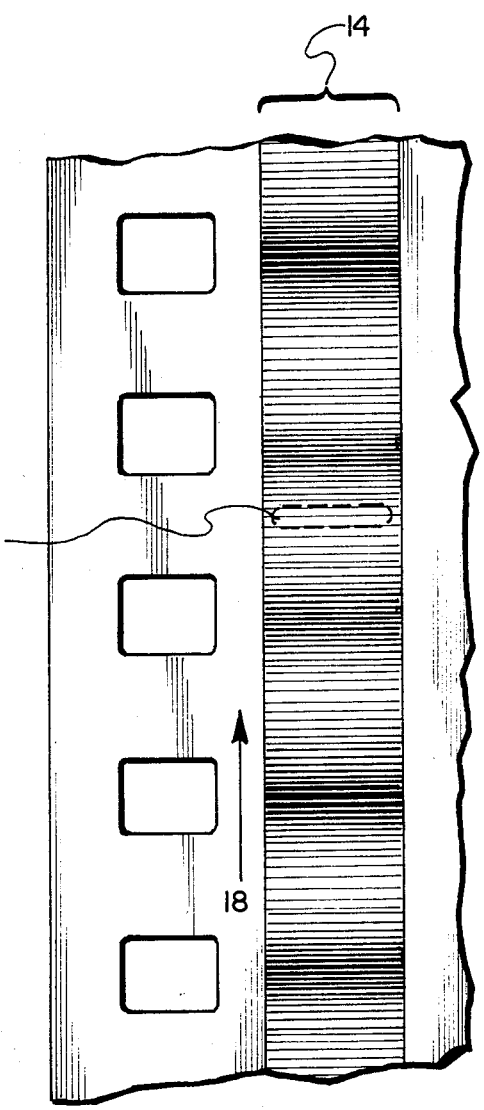

An opaque mask member 34 is positioned between film 20 and detector 32 to control the transmission of light from lens 28 onto the light detector. Mask member 34 has an aperture or slit 36 which determines the permissible light path between source 26 and detector 32. The size and position of the slit, which corresponds to the scanning slit 16 in FIG. 2, is selected such that only light which passes through the desired area on the sound track is transmitted to the light detector 32. Substantially all light outside of the desired target area is excluded from the light path between source 26 and detector 32. Mask 34 could be placed on either side of the film relative to lens 28 and detector 32, so long as its slit 36 restricts the incident light on the detector to a narrow transverse portion of the sound track corresponding to slit 16 of FIG. 2 or the like. The film reels are rotated so that the film moves past the light area and is scanned by the effective slit area. Alternatively, the film could be held stationary and optically scanned with an appropriate moving light beam.

Detector 32 transduces light transmitted through the mask slit to an electrical signal which, with appropriate scaling, has a magnitude t which directly corresponds to the amount of light transmitted through the defined area of the sound track. The electrical output of detector 32 is connected as an input to a logarithmic circuit 37, which produces an output corresponding to the logarithm of the detector output (lnt). The output of logarithmic circuit 37 is applied as an input to inverter 38, which produces an output equal in magnitude to its input but of reversed polarity. This output signal is amplified by a factor of 1/g in amplifier circuit 39. The latter circuit together with inverting circuit 38 may be considered to comprise a multiplier circuit having a multiplication factor of $-1/g$. Its output is in turn applied to the input of an antilogarithm, or exponentiating, circuit 40. This circuit performs an antilogarithmic function, producting an output signal which is substantially proportional to the exposure of the sound track, and thereby to the sound signal recorded on the sound track.

To briefly summarize the operation of the above circuit, detector 32 produces an output t which directly corresponds to the amount of light T transmitted through the sound track and mask slit. This signal is transformed by logarithmic circuit 37 to the form lnt, which becomes $-$lnt at the output of inverting circuit 38. Amplifying circuit 39 produces an output of $-$lnt/g, causing the output of exponentiating circuit 40 to a value which varies with the antilogarithm of this expression, or $e^{-lnt/g}$. Since this output signal is in the same format as the original sound track exposure (ignoring constant K and solving the expression $T = E^{-g}$ for E results in $E = e^{-lnT/g}$), the electrical output signal can be substantially equated to the original sound signal recorded on the sound track negative by an appropriate scaling of the circuit elements. This output signal can then be recorded onto a magnetic tape which is later integrated with the picture print, or used to control some other technique for applying a sound track to a finished film print.

Referring now to FIG. 4, a schematic diagram is shown which gives the preferred implementation of the block diagram of FIG. 3. A photocell 42 receives light transmitted through the sound track negative and produces a current output which is converted to a voltage signal by an operational amplifier A1, which includes a feedback resistor R1. The output of A1 is connected through resistor R2 to another operational amplifier A2, which has a transistor T1 connected in its feedback loop. The base and collector of T1 are connected together, causing it to provide a logging function, and the transistor is oriented with its principal conduction path from the inverting input to the output of A2. As is known in the art, this type of circuit will produce a signal at the output of A2 which is approximately the natural logarithm of the signal at its input. Other logging elements, such as a grounded base transistor, might also be used, but grounded base transistors often have instability problems.

The output of A2 is connected through a resistor R3 to the inverting input of another operational amplifier A3. This amplifier has a variable resistor R4 connected in its negative feedback circuit which serves to adjust its gain. A second variable resistor R5 is connected between a positive voltage terminal 44 and the inverting input of A3 to adjust the DC constant added to the output of A3. R4 and R5 are preferably implemented as potentiometers that can be conveniently adjusted, but they could also be trimmable resistors or other variable impedance devices.

The A3 output is connected to an exponentiating circuit consisting of a transistor T2 and an operational amplifier A4 with a resistor R6 connected in its negative feedback circuit. T2 is diode-connected with its principal conduction path oriented from the inverting input of A4 to the output of A3, and together with A4 forms a conventional circuit for producing an output which is approximately the antilogarithm of its input signal.

In operation, the circuit of FIG. 4 can be used to produce an electrical output which varies directly with the exposure of the negative sound track, even though the g of the negative film is unknown. To accomplish this, variable resistor R4 is initially set to a nominal position, and the sound track is scanned to produce a varying output signal from A4. This output signal is monitored for sound quality; any distortion will generally indicate an excursion in the gain of A3 from 1/g. R4 is then adjusted simultaneously with the monitoring of the output of A4 until a very high quality sound is obtained. Since it is a negative sound track, rather than a print, which provides the original sound signal, standard interface circuitry would be used at the output of A4 to obtain a true sound signal corresponding to the signal at the output of A4.

Variable resistor R5 is set to operate the exponential circuit in a proper operating range. R5 must be set so that the output of A3 is negative. Also, the setting of R5 effects the amplitude of the reconstructed signal at the output of A4, permitting the amplitude of the circuit output to be adjusted by an appropriate adjustment of R5.

A method and apparatus have thus been shown and described for reconstructing the signal on a sound track negative without having to produce an intermediate print of the sound track, and also avoiding much of the inaccuracy and expense encountered in the prior art. While a particular embodiment of the invention has been described, various modifications and alternate embodiments will occur to those skilled in the art. Accordingly, it is intended that the invention be limited only in terms of the appended claims.

I claim:

1. Apparatus for producing, from light transmitted through a variable density optical sound track formed on a film, an output electrical signal which directly corresponds to the sound signal recorded on the sound track, in which the amount of light transmitted through the sound track is related to its exposure by a predetermined relationship, comprising:
    means for transducing light transmitted through the sound track to an electrical signal having a magnitude which varies in accordance with the amount of transmitted light, and
    means for operating on said electrical signal by a function which is substantially the inverse of said predetermined relationship to produce an output signal which directly corresponds to the exposure of the sound track.

2. The apparatus of claim 1, further comprising means for adjusting said operating means to reduce any excursions in the output signal from a direct correspondence with the sound signal recorded on the sound track.

3. Apparatus for producing, from light transmitted through a variable density optical sound track formed on a film, an electrical signal which directly corresponds to a sound signal recorded on the sound track, in which the amount of light transmitted through the sound track is related to its exposure E substantially by the expression $E^{-g}$, where g is a constant relating the film transmission to its exposure, comprising:
    means for transducing light transmitted through the sound track to an electrical signal having a magnitude t which varies in accordance with the amount of transmitted light, and
    means for operating on said electrical signal by a function which is substantially equivalent to the antilogarithm of $-\ln t/g$ to produce an output signal which corresponds to the exposure of the sound track.

4. Apparatus for producing an electrical signal which directly corresponds to a sound signal recorded as a variable density optical sound track on a film, in which the amount of light transmitted through the film is related to its exposure E substantially by the expression $E^{-g}$, where g is a constant relating the film transmissivity to its exposure, comprising:
    means for directing light through the sound track,
    means for transducing light transmitted through a narrow transverse portion of the sound track to an electrical signal having a magnitude t which varies in accordance with the amount of light transmitted through said portion of the sound track,
    means for providing relative motion between the film and the light directing means so that the sound track is progressively scanned by the light, and
    means for operating on said electrical signal by a function substantially equivalent to the antilogarithm of $-\ln t/g$ to produce an output signal which corresponds to the exposure of the sound track.

5. Apparatus for producing, from light transmitted through a variable density optical sound track formed on a film, an electrical signal which directly corresponds to a sound signal recorded on the sound track, in which the amount of light transmitted through the sound track is related to its exposure E substantially by the expression $E^{-g}$, where g is a constant relating the film transmission to its exposure, comprising:
    a photocell adapted to receive light transmitted through the sound track and to produce an electrical signal having a magnitude t which corresponds to the amount of received light, a logarithmic circuit connected to the photocell to produce an electrical signal corresponding to lnt, a multiplier circuit connected to multiply the output of the logarithmic circuit by a factor substantially equal to $-1/g$, and an antilogarithm circuit connected to obtain the antilogarithm of the multiplier circuit output, said antilogarithm being substantially proportional to the exposure of the sound track and thereby to the sound signal recorded on the sound track.

6. The apparatus of claim 5, said multiplier circuit comprising an operational amplifier with a negative resistive feedback loop, the resistance value of the feedback loop being variable to enable adjustment of the amplifier.

7. The apparatus of claim 6, said operational amplifier further comprising a variable resistance means connected between a positive voltage reference and the inverting amplifier input to enable adjustment of the operating range of the antilogarithm circuit.

8. The apparatus of claim 5, said logarithmic circuit comprising an operational amplifier with a logging means connected in its feedback circuit with its forward conduction path from the amplifier's inverting input to its output.

9. The apparatus of claim 5, said antilogarithm circuit comprising an operational amplifier with a logging means connected to couple an input signal to its inverting input, the diode means having its forward conduction path oriented away from the amplifier's inverting input.

10. A method for producing an output electrical signal which directly corresponds to a sound signal recorded on film as a variable density optical sound track, the amount of light transmitted through the sound track being related to the film exposure by a predetermined relationship, comprising the steps of:

transmitting light through a portion of the sound track, receiving the transmitted light and producing an electrical signal which varies in accordance with the amount of received light, operating on said electrical signal by a function which is substantially proportional to the inverse of said predetermined relationship to produce an output signal which directly corresponds to the exposure of the sound track, and progressively scanning the sound track with the light.

11. The method of claim 10, further comprising the step of adjusting said operating function to reduce any excursions in the output electrical signal from a direct correspondence with the sound signal recorded on the sound track.

12. A method for producing an output electrical signal which directly corresponds to a sound signal recorded on a film as a variable density optical sound track, comprising the steps of:

transmitting light through a portion of the sound track, receiving the transmitted light and producing an electrical signal having a magnitude t which varies in accordance with the amount of received light, obtaining the output electrical signal by multiplying said electrical signal by a factor which is substantially proportional to the antilogarithm of $-\ln t/g$, where g is a constant relating the amount of transmitted light to the exposure E of the sound track substantially in accordance with the expression $E^{-g}$, and progressively scanning the sound track with the light.

13. A method for producing, from light transmitted through a variable density optical sound track formed on a film, an output electrical signal which directly corresponds to the sound signal recorded on the sound track, comprising the steps of:

producing an input electrical signal having a magnitude t which varies in accordance with the amount of received light, and obtaining the output electrical signal by operating on said input electrical signal by a function which is substantially equivalent to the antilogarithm of $-\ln t/g$, where g is a constant relating the amount of transmitted light to the exposure E of the sound track substantially in accordance with the expression $E^{-g}$.

14. The method of claim 13, said operating step comprising the steps of:

producing a signal corresponding to the logarithm of the input electric signal, multiplying said logarithmic signal by a factor substantially equal to $-1/g$, and producing a signal which corresponds to the antilogarithm of the multiplied signal, and is thereby substantially proportional to the sound signal recorded on the sound track as reflected in the exposure of the sound track.

15. The method of claim 13, further comprising the step of adjusting said operating function to reduce any excursions in the output electrical signal from a direct correspondence with the sound signal recorded on the sound track.

* * * * *